United States Patent
Sodemann et al.

(10) Patent No.: US 7,161,253 B2
(45) Date of Patent: Jan. 9, 2007

(54) PORTABLE POWER SOURCE

(75) Inventors: Wesley C. Sodemann, Dousman, WI (US); Billy Brandenburg, Horicon, WI (US); Kenny J Stair, North Prairie, WI (US); Herbert Hoenisch, Waukesha, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 552 days.

(21) Appl. No.: 10/635,296

(22) Filed: Aug. 6, 2003

(65) Prior Publication Data
US 2005/0031944 A1    Feb. 10, 2005

(51) Int. Cl.
*H02J 7/00* (2006.01)
*H02J 9/00* (2006.01)

(52) U.S. Cl. .................. 290/1 A; 290/50; 320/104; 320/105

(58) Field of Classification Search ............. 290/1 A, 290/2, 1 R, 50; 320/104, 105; 307/150, 307/66
See application file for complete search history.

(56) References Cited

U.S. PATENT DOCUMENTS

| | | | |
|---|---|---|---|
| 1,868,208 A | 7/1932 | Jordan | |
| 2,816,535 A | 12/1957 | Sells | |
| 2,831,352 A | 4/1958 | Elliott et al. | |
| 2,838,938 A | 6/1958 | Sacchini et al. | |
| 2,865,358 A | 12/1958 | Musgrave | |
| 2,901,911 A | 9/1959 | Duncan | |
| 3,297,010 A | 1/1967 | Beck | |
| 3,331,363 A | 7/1967 | Holton, Jr. | |
| 3,500,085 A | 3/1970 | Smith | |
| 3,518,445 A | 6/1970 | Wichman | |
| 3,645,247 A | 2/1972 | D'Amrosio | |
| 3,757,194 A | 9/1973 | Weber et al. | |
| 3,882,293 A * | 5/1975 | Naples et al. | 200/430 |
| 3,883,789 A | 5/1975 | Achenbach et al. | |
| 3,885,544 A | 5/1975 | Pfeiffer | |
| 3,911,663 A | 10/1975 | Kern et al. | |
| 3,942,027 A | 3/1976 | Fima | |
| 3,952,239 A | 4/1976 | Owings et al. | |
| 3,969,796 A | 7/1976 | Hodsdon et al. | |
| 3,973,179 A | 8/1976 | Weber et al. | |
| 4,032,806 A | 6/1977 | Seely | |
| 4,050,003 A | 9/1977 | Owings et al. | |

(Continued)

FOREIGN PATENT DOCUMENTS

CA    2369424    8/2002

(Continued)

*Primary Examiner*—Nicholas Ponomarenko
(74) *Attorney, Agent, or Firm*—Michael Best & Friedrich LLP

(57) ABSTRACT

A portable power source for starting a variety of outdoor power equipment. The portable power source generally includes a housing, an electrochemical power supply, a switch having an ON position with a fixed contact and a START position with a momentary contact, and a connector connected to the switch. The switch may be electrically connected to the electrochemical power supply and, using a cable, the connector is operable to be electrically connected to a starter motor associated with the outdoor power equipment. Actuation of the switch to the START position electrically connects the electrochemical power supply to the starter motor. The portable power source is adapted to be used as a primary power source and an auxiliary power source. The portable power source also includes an integrated light, an air compressor, a power supply indicator, and one or more inputs and outputs to receive and provide direct current ("DC") and alternating current ("AC").

23 Claims, 12 Drawing Sheets

U.S. PATENT DOCUMENTS

| | | | |
|---|---|---|---|
| 4,064,447 A | 12/1977 | Edgell et al. | |
| 4,084,123 A | 4/1978 | Lineback et al. | |
| 4,110,629 A * | 8/1978 | Dotson et al. | 290/38 R |
| 4,122,354 A | 10/1978 | Howland | |
| 4,191,917 A | 3/1980 | Brown et al. | |
| 4,309,622 A | 1/1982 | Cottrell | |
| 4,321,522 A | 3/1982 | Matsunaga | |
| 4,365,596 A | 12/1982 | Bennett, Sr. | |
| 4,372,263 A | 2/1983 | Costa | |
| 4,389,166 A * | 6/1983 | Harvey et al. | 417/234 |
| 4,391,882 A | 7/1983 | Saruwatari | |
| 4,399,782 A | 8/1983 | Shelley | |
| 4,431,245 A | 2/1984 | Jigamian et al. | |
| 4,481,458 A | 11/1984 | Lane | |
| 4,507,566 A | 3/1985 | Leatherman et al. | |
| 4,514,477 A | 4/1985 | Kobayashi | |
| 4,531,482 A | 7/1985 | Scheckel | |
| 4,559,768 A | 12/1985 | Dunn | |
| 4,569,315 A | 2/1986 | Bodnar | |
| 4,616,169 A | 10/1986 | Proffitt | |
| 4,633,689 A * | 1/1987 | Wolniak et al. | 70/379 R |
| 4,667,141 A * | 5/1987 | Steele | 320/105 |
| 4,751,452 A | 6/1988 | Kilmer et al. | |
| 4,791,347 A | 12/1988 | Britton | |
| 4,830,412 A | 5/1989 | Raad et al. | |
| 4,835,410 A | 5/1989 | Bhagwat et al. | |
| 4,843,298 A | 6/1989 | Brauch et al. | |
| 4,870,811 A | 10/1989 | Steele | |
| 4,876,490 A | 10/1989 | Kolb | |
| 4,883,973 A | 11/1989 | Lakey et al. | |
| 5,022,587 A * | 6/1991 | Hochstein | 239/72 |
| 5,054,563 A | 10/1991 | Zapf | |
| 5,065,086 A | 11/1991 | Takakado | |
| 5,077,513 A | 12/1991 | Dea et al. | |
| 5,083,076 A * | 1/1992 | Scott | 320/105 |
| 5,085,043 A | 2/1992 | Hess et al. | |
| 5,111,127 A * | 5/1992 | Johnson | 320/101 |
| 5,132,604 A | 7/1992 | Shimane et al. | |
| 5,175,439 A | 12/1992 | Harer et al. | |
| 5,208,525 A | 5/1993 | Lopic et al. | |
| 5,345,900 A | 9/1994 | Wisegerber | |
| 5,367,250 A * | 11/1994 | Whisenand | 324/133 |
| 5,370,091 A * | 12/1994 | Swagerty et al. | 123/179.1 |
| 5,444,352 A | 8/1995 | Hutchings | |
| 5,689,174 A | 11/1997 | Pacheco, Sr. | |
| 5,739,675 A | 4/1998 | Green et al. | |
| 5,751,070 A | 5/1998 | Nagao et al. | |
| 5,764,025 A | 6/1998 | Lehmann | |
| 5,793,185 A | 8/1998 | Prelec et al. | |
| 5,886,497 A * | 3/1999 | Zaharia | 318/779 |
| 5,890,460 A | 4/1999 | Ball et al. | |
| 5,899,174 A | 5/1999 | Anderson et al. | |
| RE36,250 E | 7/1999 | Hess et al. | |
| 5,929,537 A | 7/1999 | Glennon | |
| 5,967,304 A * | 10/1999 | MacKay et al. | 200/565 |
| 5,982,138 A * | 11/1999 | Krieger | 320/105 |
| 5,998,976 A | 12/1999 | Steffan | |
| 6,002,235 A * | 12/1999 | Clore | 320/105 |
| 6,008,545 A | 12/1999 | Nagano et al. | |
| 6,018,200 A | 1/2000 | Anderson et al. | |
| 6,046,572 A * | 4/2000 | Matthews et al. | 320/116 |
| 6,065,942 A * | 5/2000 | Glidden et al. | 417/236 |
| 6,104,157 A | 8/2000 | Kramer et al. | |
| 6,140,798 A | 10/2000 | Krieger | |
| 6,160,373 A | 12/2000 | Dunn et al. | |
| 6,202,776 B1 | 3/2001 | Masberg et al. | |
| 6,222,342 B1 * | 4/2001 | Eggert et al. | 320/105 |
| 6,265,091 B1 | 7/2001 | Pierson et al. | |
| 6,265,786 B1 | 7/2001 | Bosley et al. | |
| 6,313,543 B1 | 11/2001 | Frank | |
| 6,321,707 B1 | 11/2001 | Dunn | |
| 6,384,573 B1 | 5/2002 | Dunn | |
| 6,400,121 B1 * | 6/2002 | Tracey | 320/104 |
| 6,426,606 B1 | 7/2002 | Purkey | |
| 6,459,175 B1 | 10/2002 | Potega | |
| 6,476,509 B1 | 11/2002 | Chen et al. | |
| 6,479,964 B1 | 11/2002 | Woodroffe et al. | |
| 6,576,855 B1 * | 6/2003 | Levendis et al. | 200/339 |
| 6,597,150 B1 * | 7/2003 | Bertness et al. | 320/104 |
| 6,608,401 B1 | 8/2003 | Walter | |
| 6,636,015 B1 | 10/2003 | Levine et al. | |
| 6,665,158 B1 | 12/2003 | Walter | |
| 6,799,993 B1 * | 10/2004 | Krieger et al. | 439/500 |
| 6,872,905 B1 * | 3/2005 | Kuepper et al. | 200/430 |
| 2002/0047419 A1 | 4/2002 | Shimizu et al. | |
| 2004/0009075 A1 | 1/2004 | Meza et al. | |
| 2004/0012204 A1 | 1/2004 | Walter et al. | |

FOREIGN PATENT DOCUMENTS

| | | |
|---|---|---|
| EP | 0071356 | 2/1983 |
| EP | 1116828 | 7/2001 |
| GB | 1422759 | 1/1976 |
| GB | 1515390 | 6/1978 |
| GB | 2173633 | 10/1986 |
| WO | WO 02/29955 A2 | 4/2002 |

* cited by examiner

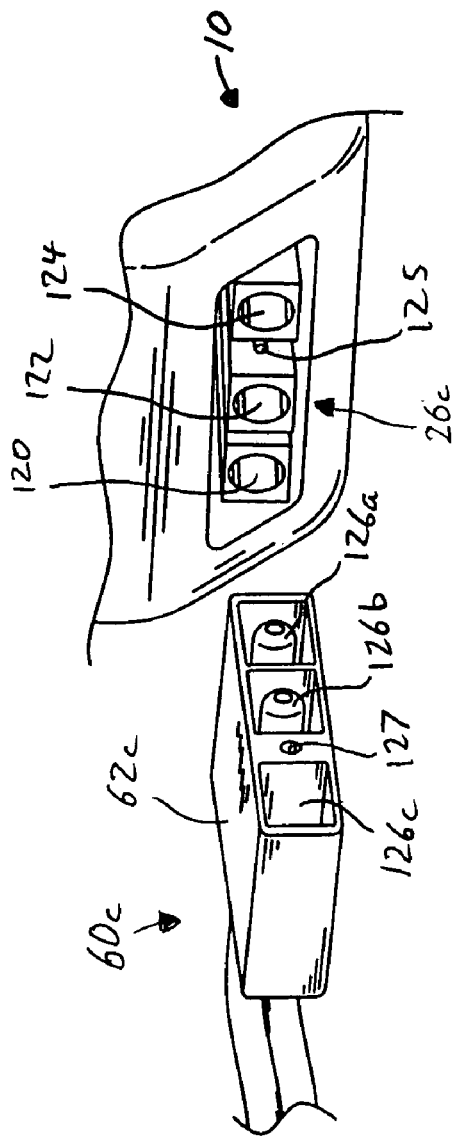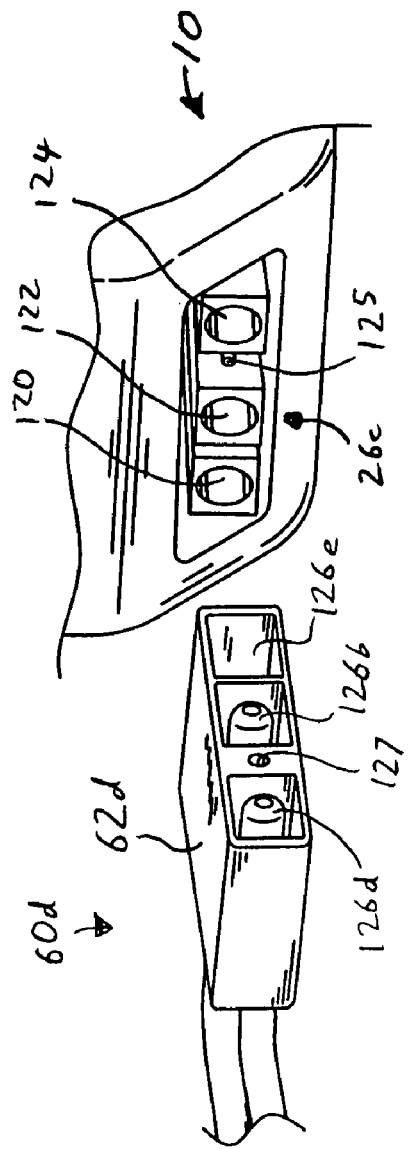
FIG. 10
FIG. 10A

PORTABLE POWER SOURCE

FIELD OF THE INVENTION

The invention generally relates to a portable power source having a battery. More particularly, the invention relates to a portable power source having a momentary contact for starting engine-driven equipment.

BACKGROUND OF THE INVENTION

A variety of systems exist for starting outdoor power equipment having engines with a starter motor. These systems typically include a primary battery located on the equipment and connected to the starter motor, and employ an on-board ignition system to start the engine. Often the primary battery loses charge and does have enough energy available to operate the starter motor and thus start the engine. In these situations, the battery must be "jumped" using another battery, such as from another piece of equipment or vehicle. Individuals may not be comfortable connecting an auxiliary battery directly to a primary battery with so-called "jumper" cables due to sparking and other factors. In addition, outdoor power equipment is often exposed to harsh outside environments. An on-board battery is often subject to corrosion from elements such as water, salt, and dirt, and also increases the overall weight of the equipment.

SUMMARY OF THE INVENTION

Accordingly, disclosed is a portable power source for starting a variety of outdoor power equipment. In one embodiment, the power source is used for starting engine-driven equipment having a starter motor. The portable power source generally includes a housing, an electrochemical power supply such as a battery or fuel cell, a switch having an ON position with a fixed contact and a START position with a momentary contact, and a connector connected to the switch. The switch may be electrically connected to the electrochemical power supply and the connector is operable to be electrically connected to the starter motor.

In addition, a system for starting engine-driven equipment generally includes a portable power source, including an electrochemical power supply, a switch, a cable adapted to be electrically connected to the portable power source, and a connector coupled to the engine-driven equipment and operable to be connected to the cable. In one embodiment, actuation of the switch to a START position electrically connects the electrochemical power supply to the starter motor. The portable power source is adapted to be used as a primary power source and an auxiliary power source.

Other embodiments include a method of starting engine-driven equipment having a starter motor that includes providing a portable power source having an electrochemical power supply and a momentary contact switch, and adapted to be used as a primary source of power, electrically connecting a cable to the portable power source, electrically connecting the cable to the starter motor, and actuating the momentary contact of the switch to electrically connect the electrochemical power supply to the starter motor.

The portable power source may also include features such as an integrated light, an air compressor, and a power supply indicator. Also included are one or more inputs to receive direct current ("DC") for charging and one or more outputs to provide alternating current ("AC").

BRIEF DESCRIPTION OF THE DRAWINGS

FIG. 10 illustrates an exemplary plug and connector configuration according to one embodiment of the invention.

FIG. 10A illustrates an exemplary plug and connector configuration according to another embodiment of the invention.

DETAILED DESCRIPTION OF THE INVENTION

Figure 1:
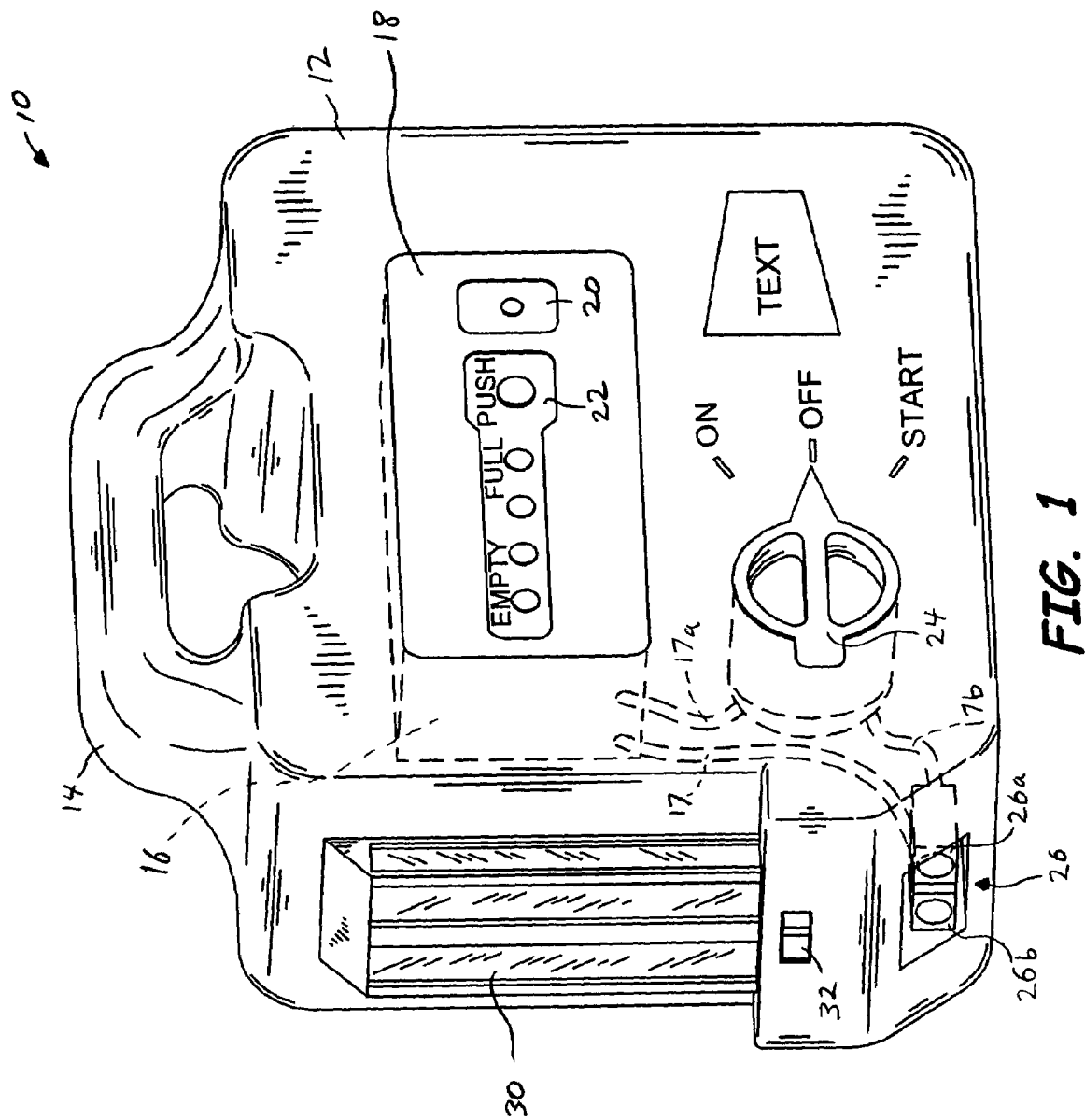
FIG. 1 illustrates a perspective view of an exemplary portable power source according to one embodiment of the invention.

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

FIG. 1 illustrates one embodiment of a portable power source, or simply pack 10, including a housing 12. The pack 10 includes an integrally molded handle 14 and is light enough to be manually handled by an operator. The housing 12 houses one or more electrochemical power supplies, such as a battery 16, which is coupled to a status panel 18 on the front side of the housing 12. It should be noted that the battery 16 may include a variety of energy sources including lead acid batteries, nickel cadmium batteries, lithium batteries, fuel cells, or others. The status panel 18 may provide a variety of battery information, such as a charging indicator 20 and a battery status indicator 22. In addition, the battery 16 is electrically coupled to a multi-contact switch 24 (described below) and a terminal 26*a* of a connector 26. Although the switch 24 is shown as a rotary or dial-type switch, other switch types may be employed. An output of the switch 24 is electrically coupled to a terminal 26*a* of the connector 26. It should also be noted that although FIG. 1 illustrates the battery 16 coupled to the connector 26 and switch 24 via wires 17 and 17*a*, and that wire 17*b* couples the switch 24 to terminal 26*a*, additional conditioning circuitry may also be included between the battery 16 and connector 26. Moreover, the switch 24 may be coupled to relay circuitry to control the connection of the battery 16 to the connector 26.

Figure 3:
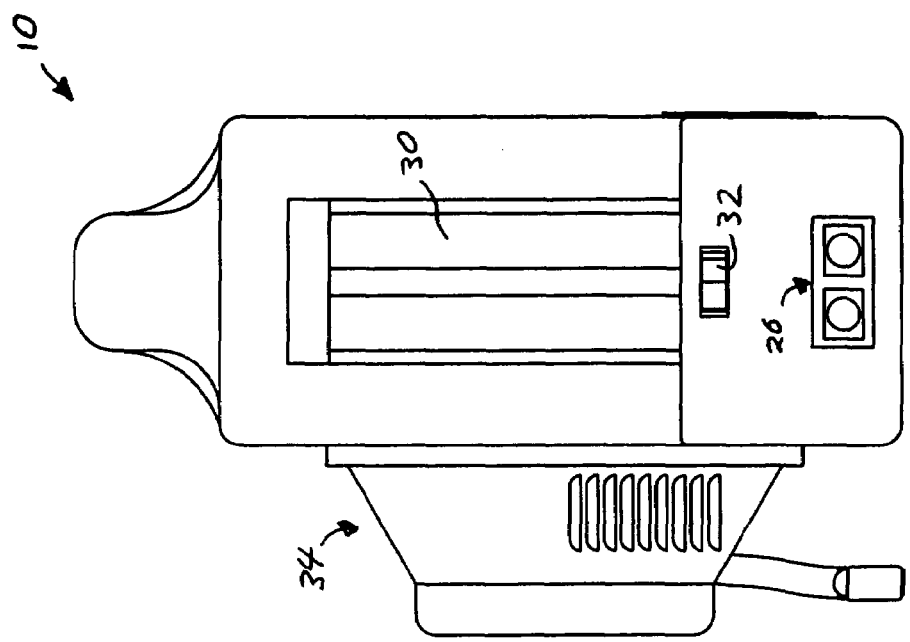
FIG. 3 illustrates a left side view of the exemplary portable power source according to one embodiment of the invention.
Figure 2:
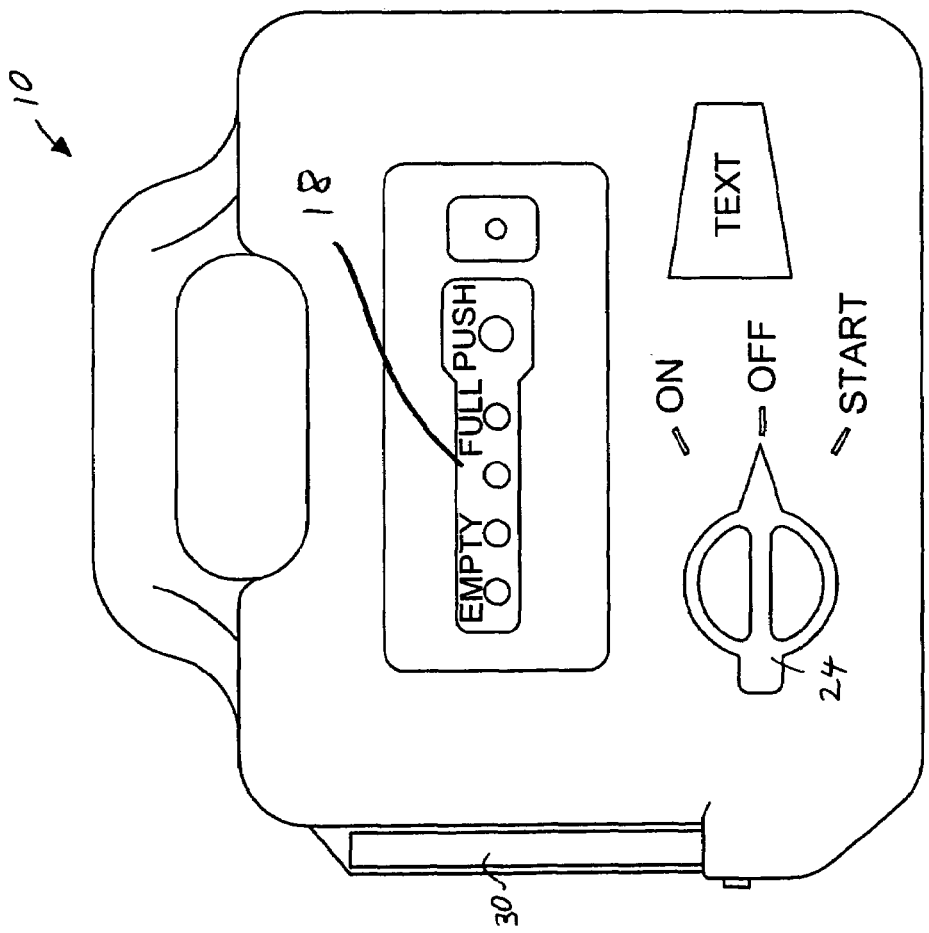
FIG. 2 illustrates a front view of the exemplary portable power source according to one embodiment of the invention.
Figure 5:
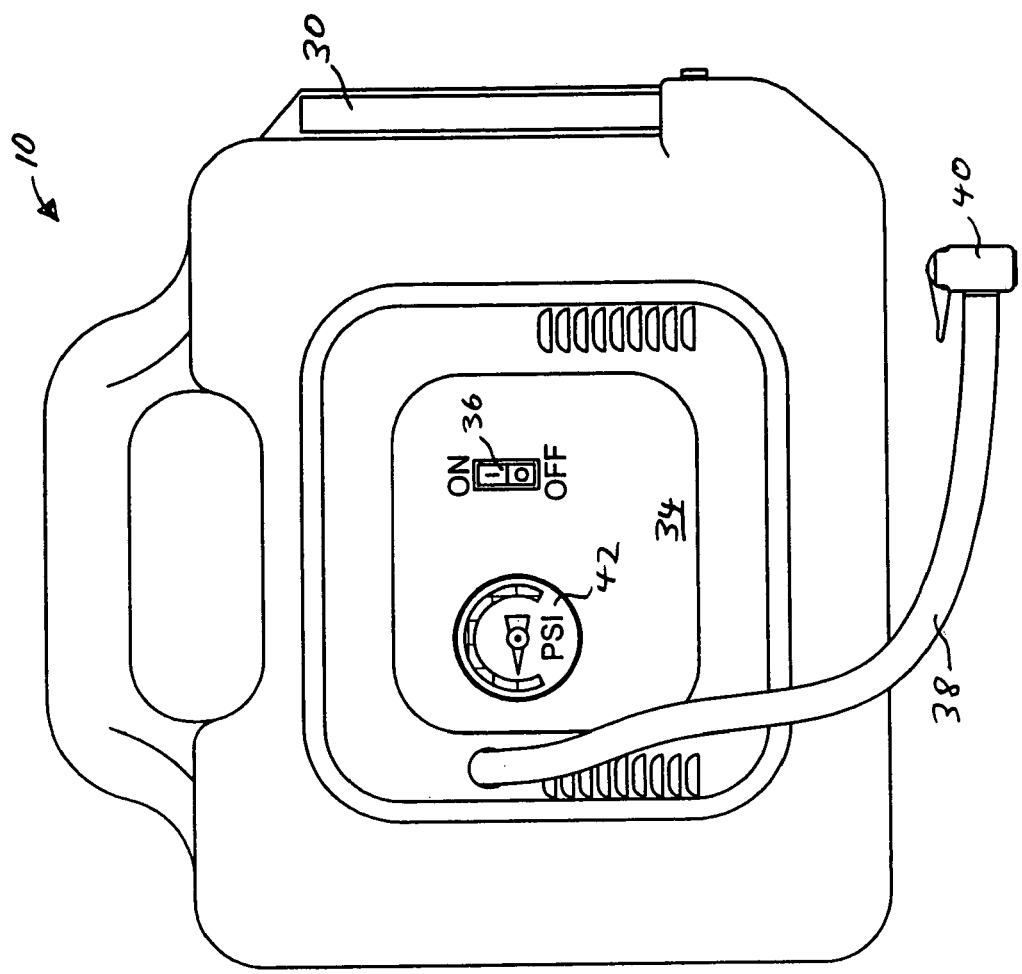
FIG. 5 illustrates a rear view of the exemplary portable power source according to one embodiment of the invention.

The pack 10 may provide a variety of other features including a light 30 controllable by a toggle switch 32. FIGS. 2–5 are views of the pack 10 and features associated therewith. More specifically, FIG. 2 is a front view of the pack 10 including the status panel 18, switch 24, and light 30. FIG. 3 illustrates a side view of the pack 10 including the light 30, toggle switch 32, connector 26, and a housing of an air compressor 34 integrated into the pack 10. FIG. 5 depicts a rear view of the pack 10 including the air compressor 34 and light 30. The air compressor 34 includes an on/off switch 36 and a hose 38. The end of the hose 38 includes one of several types of air nozzles 40. In addition, the air compressor 34 includes a pounds per square inch ("PSI") gauge 42 for monitoring air pressure.

Figure 4:
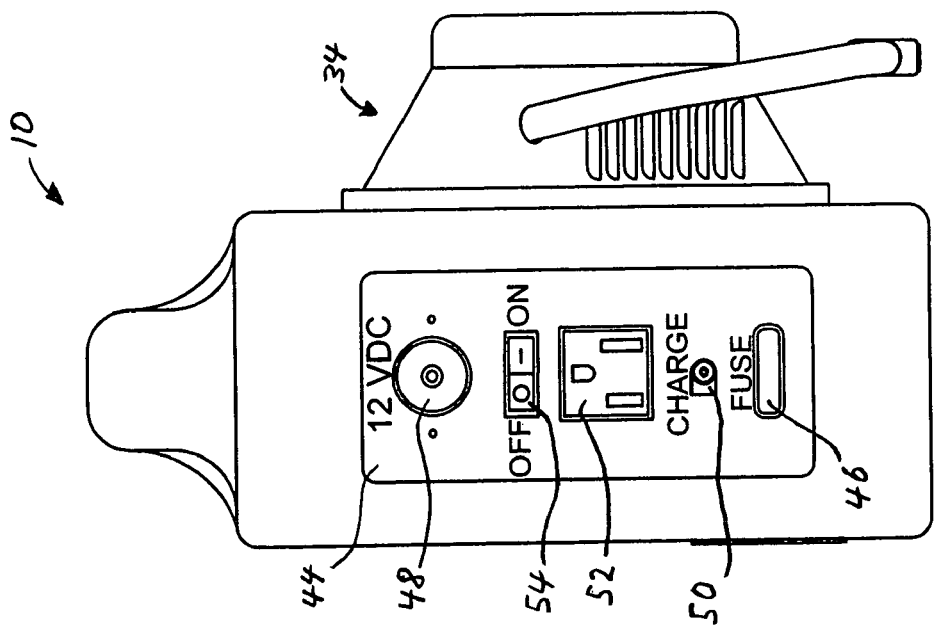
FIG. 4 illustrates a right side view of the exemplary portable power source according to one embodiment of the invention.

FIG. 4 depicts an alternate side view of the pack 10 including an interface panel 44. The interface panel 44 includes a fuse 46 and inputs for charging the battery 16 including direct current ("DC") sockets 48 and 50. The socket 48 is configured to accept a DC source from a vehicle accessory outlet such as a plug for a vehicle cigarette lighter. The socket 48 may also be used to provide an output signal, such as 12 volt DC signal, to power equipment such as a spotlight. The socket 50 is configured to receive a DC signal from an alternating current ("AC") source using one of many types of conventional AC to DC converters. Accordingly, sockets 48 and 50 allow the pack 10 to be charged using a DC or AC source. The interface panel 44 also includes an AC output socket 52 coupled to a switch 54. The AC output socket 52 provides AC power from the pack 10 by converting the DC signal from the battery 16 (FIG. 1) to an AC signal using an inverter (not shown). The inverter may be configured similar to a variety of commercially available inverter designs. The switch 54 controls the availability of AC power at the socket 52.

Figure 6B:
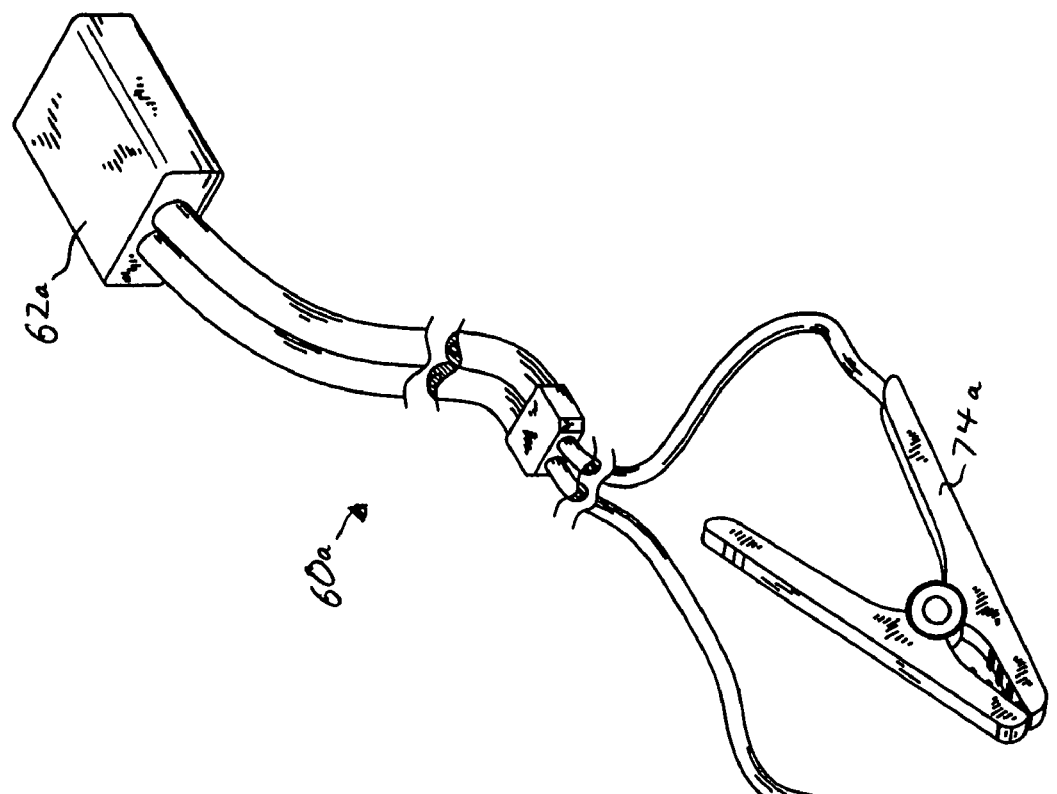
FIGS. 6A–6D illustrate exemplary cables according to embodiments of the invention.
Figure 6A:
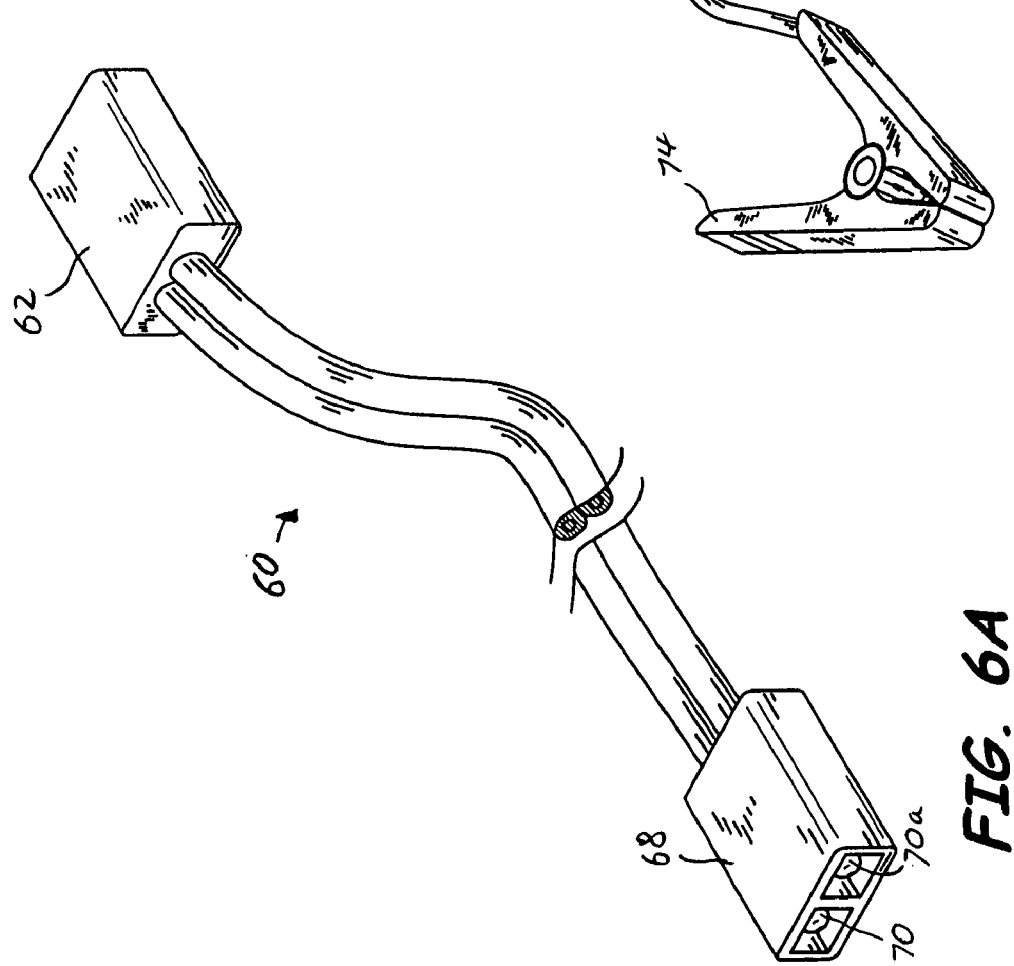

As noted above, the connector 26 includes terminals 26*a* and 26*b* (FIG. 1). The terminals are configured to receive a cable having a corresponding plug configuration. FIGS. 6A and 6B illustrate respective cables 60 and 60*a* having plugs 62 and 62*a*. The cables 60 and 60*a* may be two-wire cables and, accordingly, plugs 62 and 62*a* have a configuration that is adapted to mate with the connector 26 in a conventional male/female connector relationship.

Referring to FIG. 6A, in one embodiment the other end of cable 60 includes a plug 68 having terminals 70 and 70*a*. The plug 68 may be similar to plug 62 and is received by a mating connector (described below) on a piece of outdoor power equipment. As one alternative, cable 60*a* of FIG. 6B includes clips 74 and 74*a*, which may be similar to conventional "alligator" clips employed on jumper cables. The cable 60*a* may be used to connect the pack 10 to a conventional battery, or other sources having terminal posts, by connecting the clips 74 and 74*a* to the corresponding terminals.

Figure 6D:
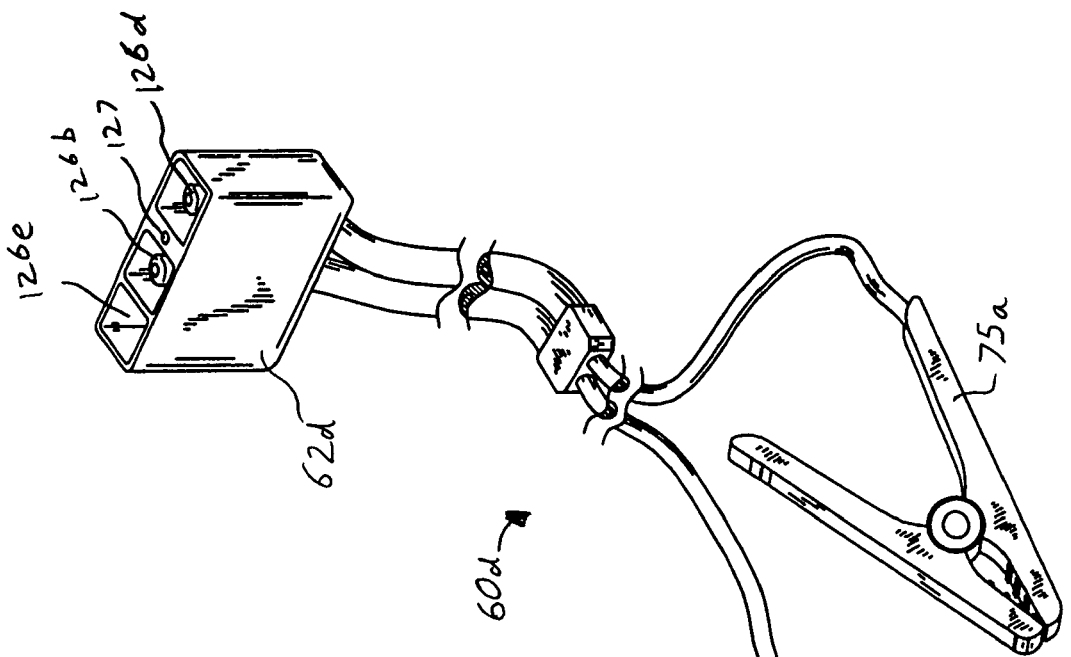
Figure 6C:
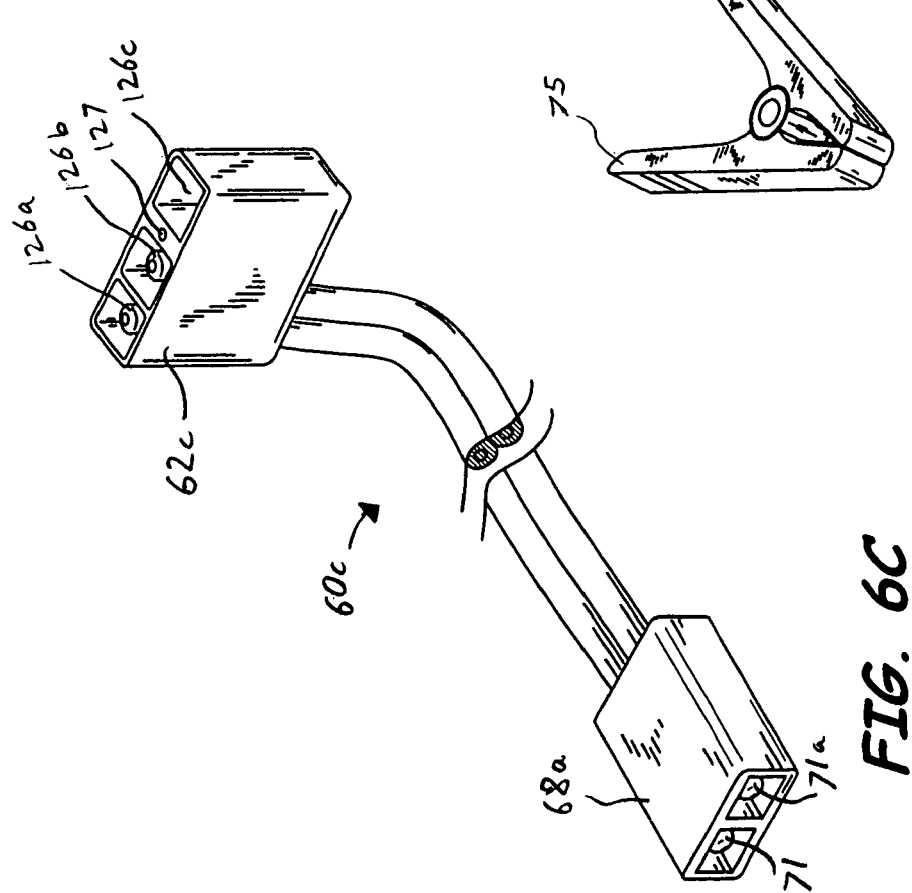

FIGS. 6C and 6D illustrate other cable configurations including a cable 60*c* and 60*d*. Referring to FIG. 6C, in one embodiment the end 68*a* of cable 60*c* may be configured similar to plug 68 of cable 60 and is operable to mate with a connector on a piece of outdoor power equipment. The plug 62*c* of cable 60*c* is a three slot plug configured for insertion into the pack 10 in a single orientation. The keyed plug 62*c* includes terminals 126*a* and 126*b*, and a pin recess 127. In one embodiment, the two wires of cable 60*c* are electrically connected to terminals 126*a* and 126*b*, and slot 126*c* does not contain a terminal. Alternatively, cable 60*d* of FIG. 6D illustrates clips 75 and 75*a* that are electrically connected to terminals 126*b* and 126*d*, and slot 126*e* does not contain a terminal. The keyed configuration of plugs 62*c* and 62*d* ensures insertion is a single orientation and the alternate wiring schemes connect the cable with an appropriate portion of an operating circuit (described below) depending on whether the pack is being used as a primary or auxiliary source of power. For example, the keyed plug and wiring configurations prevent the pack 10 from being used as an auxiliary power source when cable 60*c* is used and likewise prevents the pack 10 from being used as a primary power source when cable 60*d* is used.

Figure 7C:
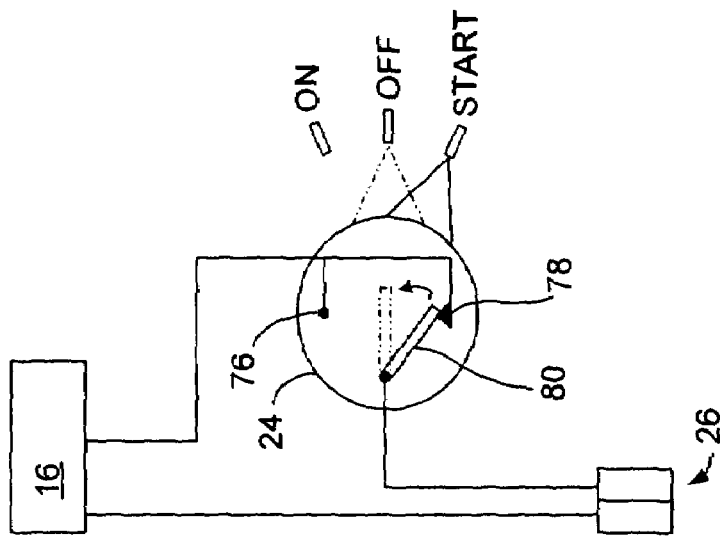
FIGS. 7A–7C illustrate a schematic representation of a switch in operable conditions according to embodiments of the invention.
Figure 7B:
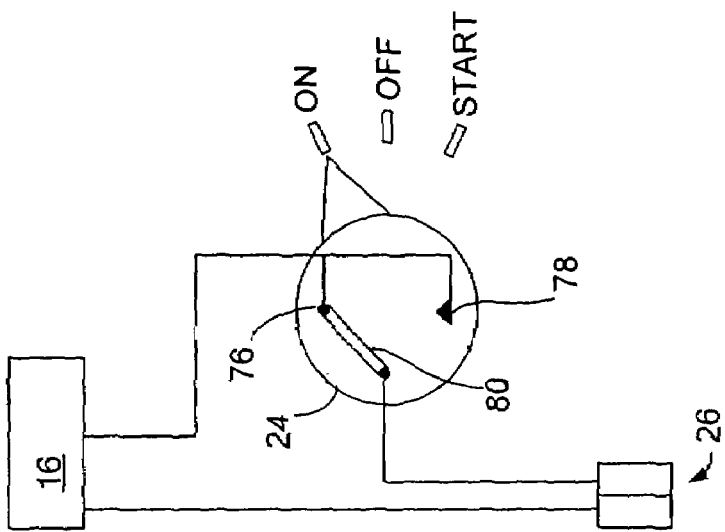
Figure 7A:
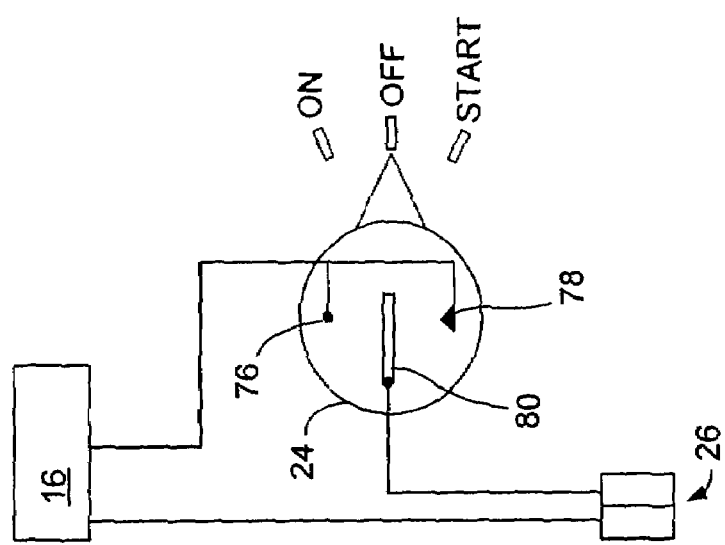

As described in conjunction with FIG. 1 and the cables in FIGS. 6A–6B, the switch 24 may be connected between the battery 16 and the connector 26. FIGS. 7A, 7B, and 7C are schematic representations of the switch 24 in operable positions including the electrical contacts associated with the battery 16 and connector 26. As noted above, signal conditioning and relay circuitry may also be included between the battery 16 and connector 26. Specifically, the switch 24 may be configured as a three-way switch having contacts 76 and 78 and a wiper 80. As shown in FIG. 7A, the central or neutral location of the wiper 80 may be considered an "OFF" position. In the OFF position, no connection is made between the battery 16 and terminal 26*a*, thereby restricting the availability of power at connector 26. The switch 24 may be rotated, or otherwise switched, in either direction away from the OFF position.

FIG. 7B illustrates a schematic in which the wiper 80 is switched to contact 76. In one embodiment, contact 76 is a fixed contact corresponding to an "ON" position. The wiper 80 may be rotated or otherwise switched to the fixed contact 76, thereby electrically coupling terminal 26*a* to the battery 16. Because contact 76 is a fixed contact, the wiper 80 will remain in contact with contact 76 until manually switched to the neutral position of FIG. 7A. In other words, power is available at the connector 26 until the operator manually switches the switch 24 from the ON position to the OFF position.

FIG. 7C illustrates a schematic in which the wiper 80 is switched to contact 78. In one embodiment, contact 78 is a momentary contact corresponding to a "START" position of the switch 24. The wiper 80 may be switched to contact 78 (as shown in solid) to electrically connect the battery 16 to terminal 26*a*. However, because contact 78 is a momentary contact, connection between terminal 26*a* and the battery 16 remains only for the duration that the switch 24 is manually held in the START position. Upon release of the switch 24, the wiper 80 automatically returns to the OFF position (as shown in phantom). This configuration allows an operator to establish power at the connector 26, and to equipment connected thereto, while manually actuating the switch 24, and removes power from the connector 26 when manual actuation ceases.

Figure 8:
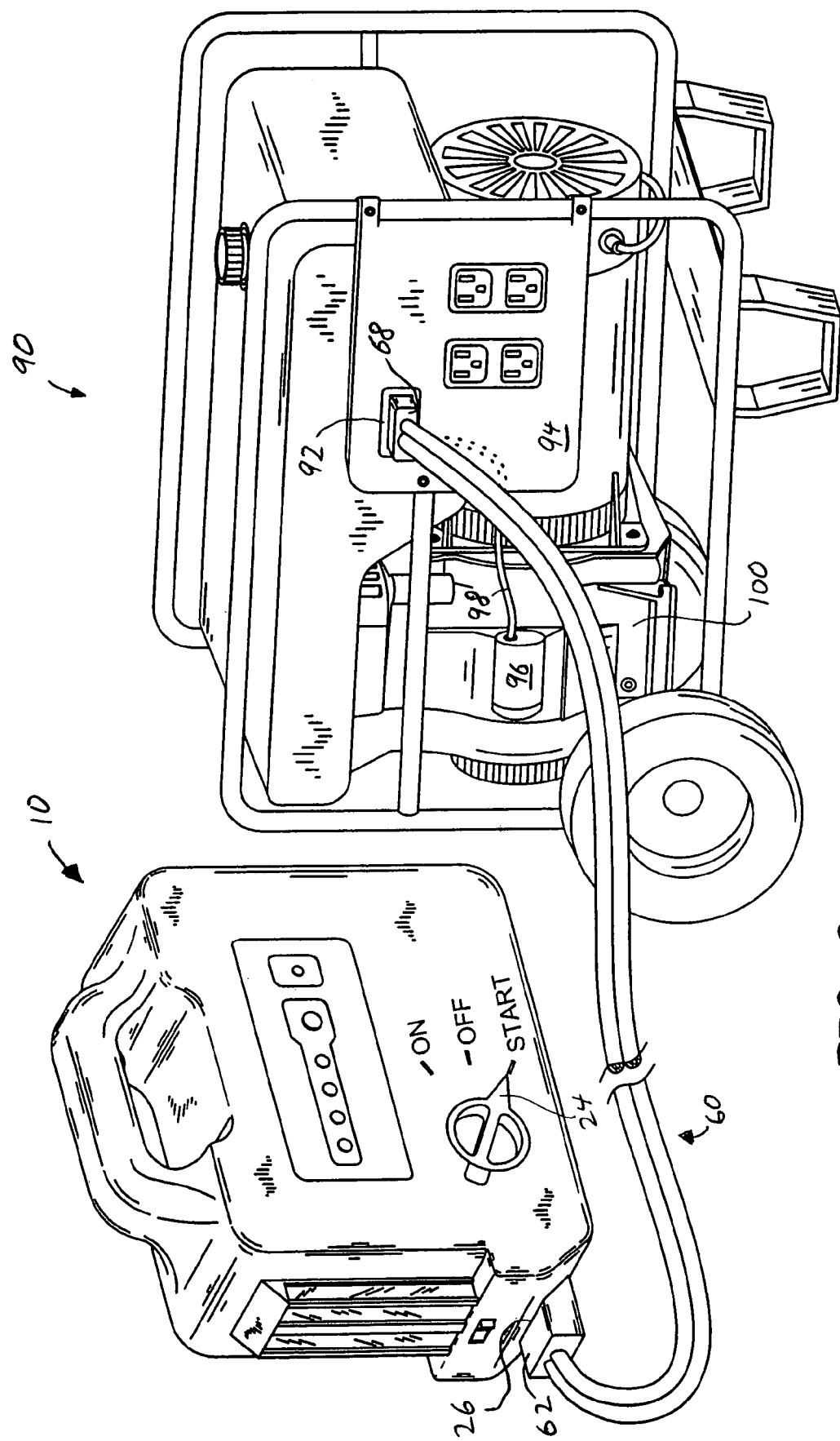
FIG. 8 illustrates a configuration of the portable power source as a primary source of power to start a generator according to one embodiment of the invention.
Figure 8A:
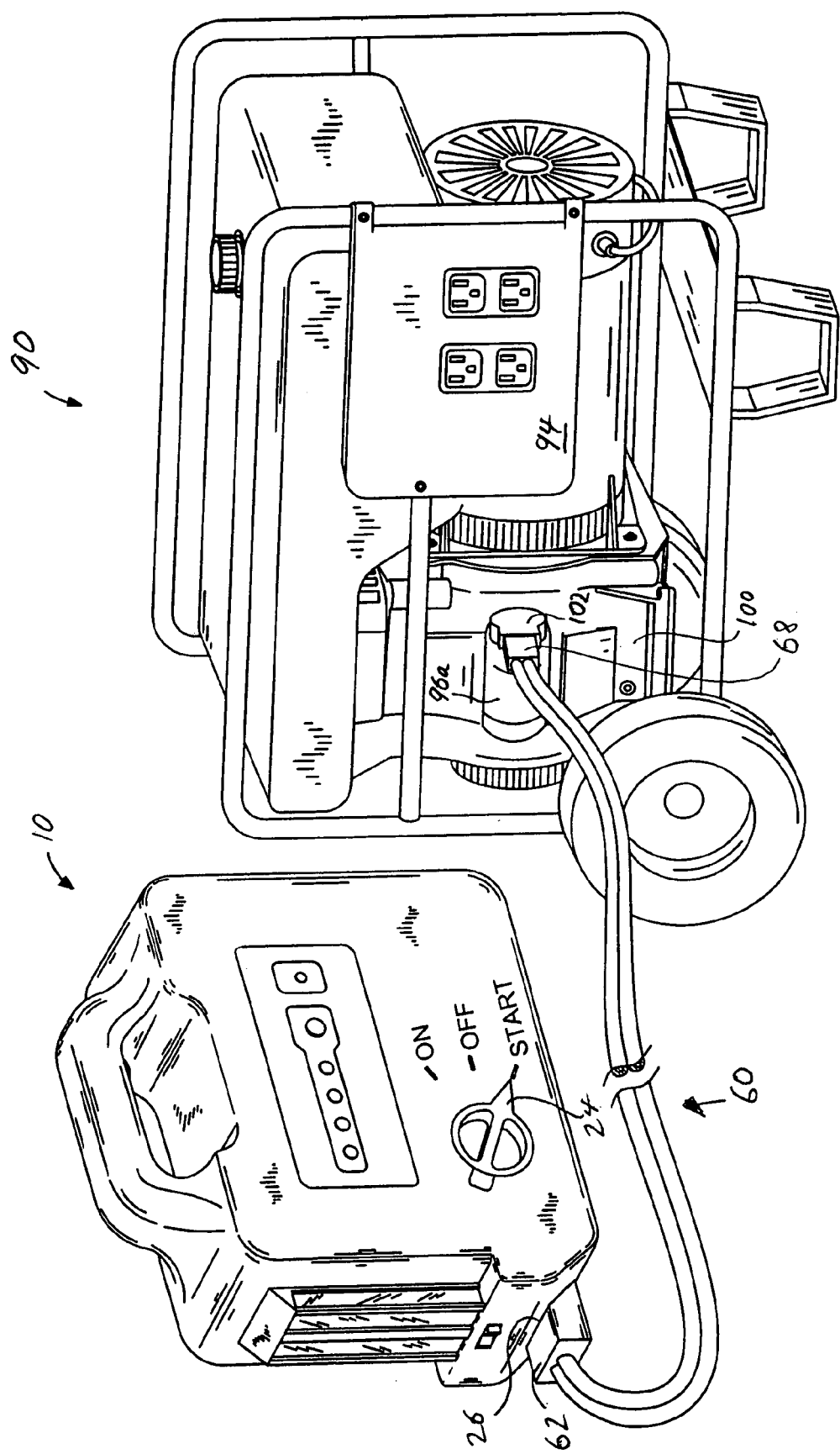
FIG. 8A illustrates a configuration of the portable power source as a primary source of power to start a generator having an alternate starter configuration according to one embodiment of the invention.
Figure 9:
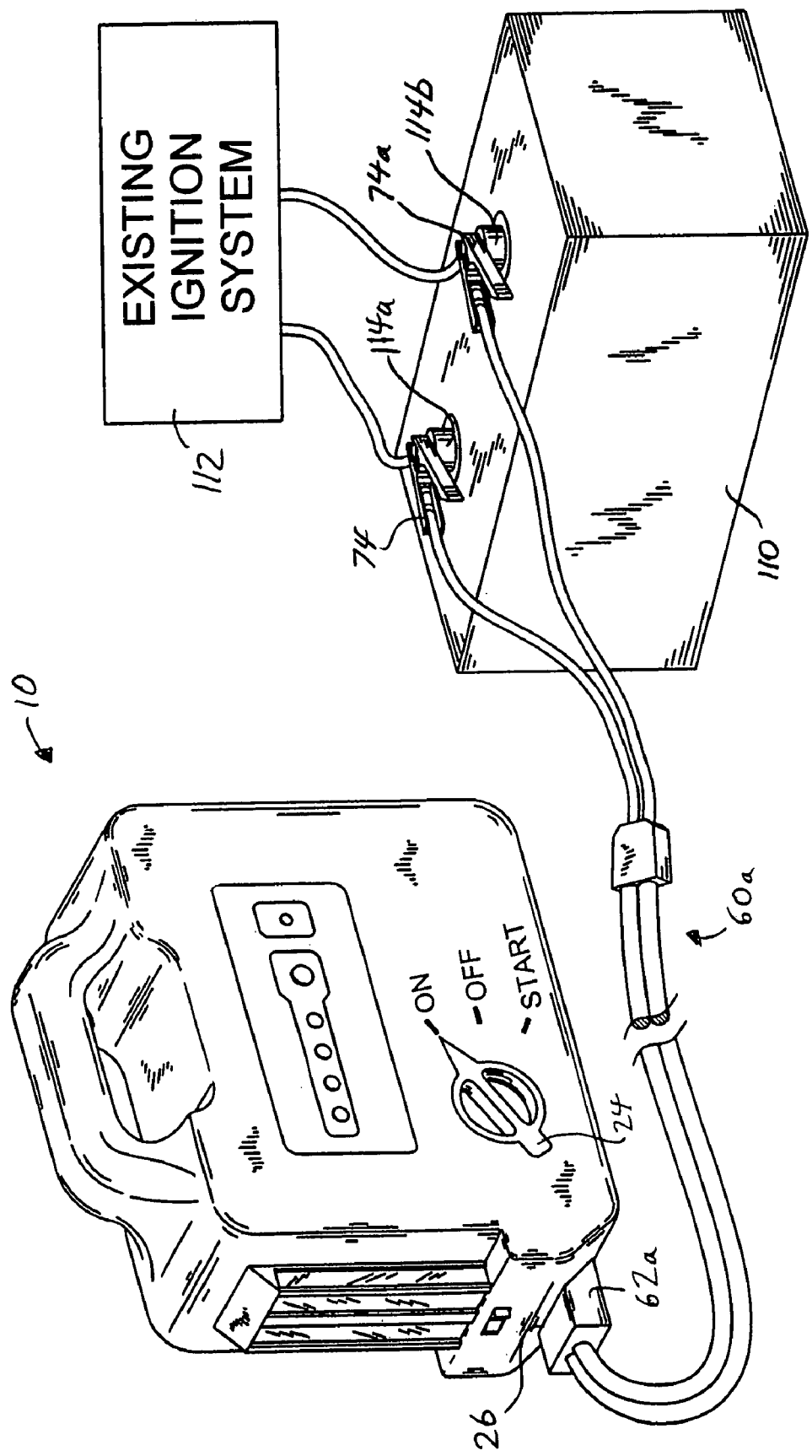
FIG. 9 illustrates a configuration of the portable power source as an auxiliary source of power to start engine-driven equipment according to one embodiment of the invention.

FIGS. 8 and 9 illustrate use of the pack 10 as a primary and auxiliary source of power. In particular, FIG. 8 includes the pack 10 connected to a portable generator 90 via cable 60 (as described in FIG. 6A). Although the principles of the invention are illustrated as being applied to a portable generator, other types of outdoor power equipment may be used. In operation, a user desiring to start the generator 90 attaches plug 62 to connector 26 on the pack 10. The other plug 68 is connected to a mating connector 92 located on a front panel 94 of the generator 90. The generator 90 may be configured without an on-board or local battery to provide power to a starter motor 96 associated with the engine 100. Instead, the connector 92 is electrically connected to the chassis-grounded starter motor 96 using cable 98. It should also be noted that a single cable 98 may be wired between the starter motor 96 and connector 92 and the other terminal of connector 92 can be coupled to a ground or common voltage potential on the engine 100. FIG. 8A illustrates one alternative configuration where a mating plug 102 is located on the starter motor 96a. The plug 102 may be integrally molded with a portion of the starter motor 96a and allows direct connection of the pack 10 to the starter motor 96a. Because the pack 10 is the primary source of starting power, the switch 24 is used to initiate starting of the engine 100. Specifically, the operator manually actuates the switch 24 to the START position, which enables current to flow from the pack 10 to the starter motor 96. The operator holds the switch 24 in the START position until the engine 100 has started and then releases the switch 24. Upon release, the switch 24 automatically returns to the OFF position, thereby ceasing the availability of power from the pack 10 via cable 60. Once the generator 90 is started, the cable 60 is removed from connector 92 and the pack 10 may be stored remotely.

In another embodiment, the pack 10 may be implemented as a auxiliary power source. FIG. 9 illustrates the pack 10 connected to a battery 110, which is connected to an existing engine starting system 112. The battery 110 may represent a primary battery used to start equipment, such as lawnmowers, tractors, automobiles, vehicles, or the like. In this configuration, plug 62a of the cable 60a is connected to the pack 10 and clips 74 and 74a are connected to terminals 114a and 114b of the battery 110. To provide auxiliary power to the battery 110, the switch 24 is actuated to the ON position. As previously discussed, the ON position corresponds to a fixed contact and, therefore, the switch 24 will remain in the ON position without the operator having to hold the switch 24. With auxiliary power being supplied from the pack 10, an operator may then actuate the existing or primary starting system 112.

FIG. 10 illustrates another embodiment of the invention including a three terminal connector 26c on the pack 10 with keyed terminals 120, 122, 124. The connector 26c is arranged such that a pin 125 is located between terminals 122 and 124, thereby offsetting terminal 124 and preventing a corresponding plug from being inserted in more than one orientation. The cable 60c is illustrated to show the insertion orientation whereby pin 125 mates with pin recess 127. As described above, the two wires are connected to terminals 126a and 126b of plug 62c, whereby upon insertion of the plug 62c in to connector 26c, electrically connects the wires to terminals 120 and 122, respectively. The slot 126c, although connected to terminal 124, is unused or disabled. Similarly in FIG. 10A, if cable 60d were utilized, terminals 126b and 126d would be electrically connected to terminals 122 and 124, leaving slot 126e unused and therefore terminal 120 disabled. This allows a user to enable one of either the ON or START position of the switch 24, while disabling the other switch position depending on the intention of the pack 10 as either an auxiliary or primary power source.

Figure 11:
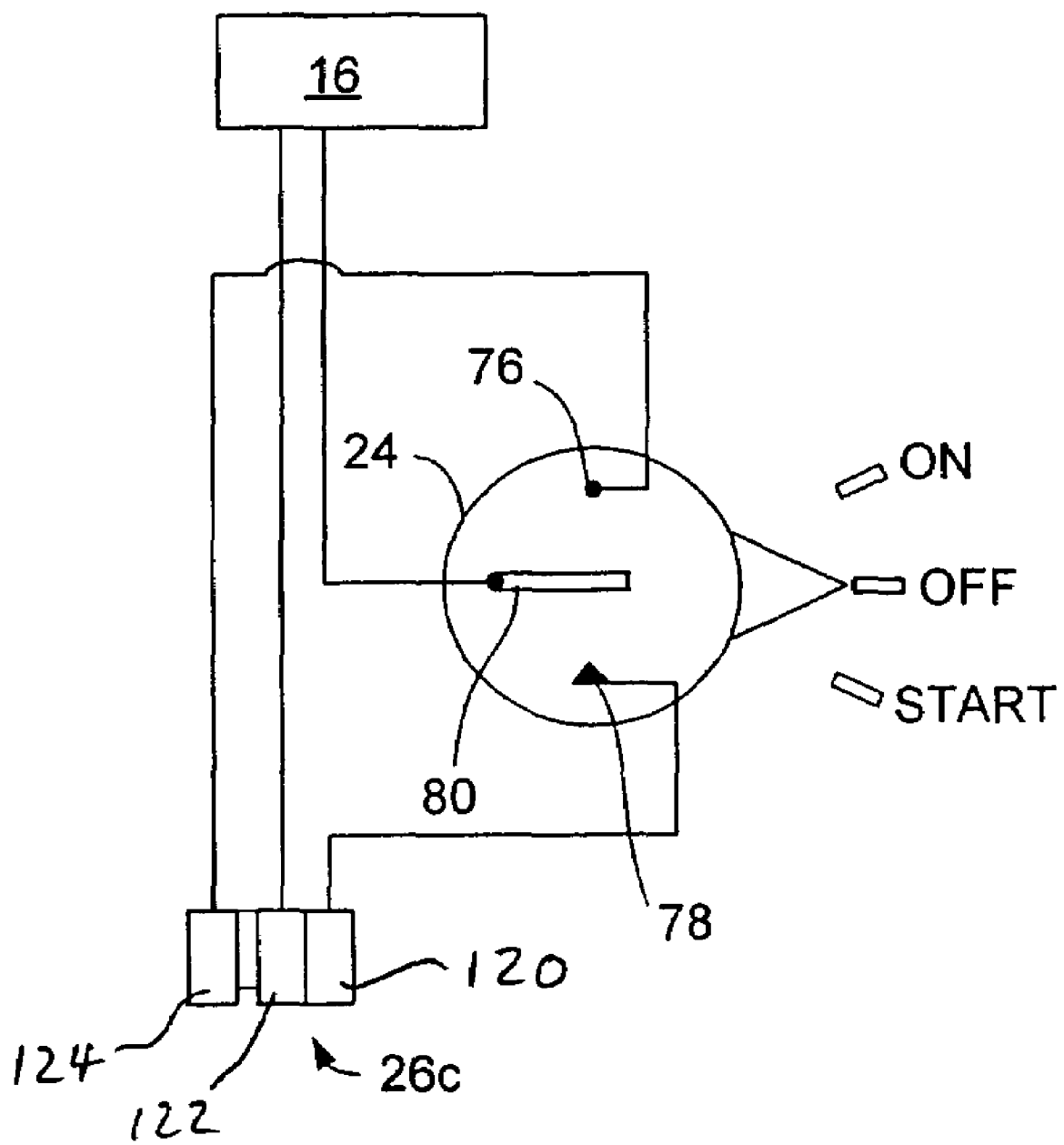
FIG. 11 illustrates a schematic representation of a switch circuit according one embodiment of the invention.

FIG. 11 illustrates an exemplary schematic associated with the connector 26c and cables 60c and 60d as described above. Specifically, the battery 16 is coupled to the wiper 80 of switch 24 and the center terminal 122. In one embodiment, the terminal 122 may be connected to the negative or ground terminal of the battery 16 and the wiper 80 may be connected to the positive or hot terminal of the battery 16. The terminal 124 is connected to the fixed contact 76 and the terminal 120 is connected to the momentary contact 78. Accordingly, terminals 122 and 124 are associated with the ON position of the switch 24 and terminals 122 and 120 are associated with the START position. In operation, a user intending to use the pack 10 as a primary power source connects the plug 62c of cable 60c to terminals 120, 122, and 124. By using cable 60c, only terminals 120 and 122 are electrically coupled to terminals 71 and 71a (FIG. 6C). Actuation of the switch 24 to the START position connects the wiper 80 to the momentary contact 78, thereby providing power from the battery 16 to the externally connected power equipment. The switch 24 can be actuated to the ON position, however terminal 124 is not electrically connected and therefore no power is transferred from the pack 10. Alternatively, a user intending to use the pack 10 as an auxiliary power source connects the plug 62d of cable 60d to terminals 120, 122, and 124. By using cable 60d, only terminals 122 and 124 are electrically coupled to clips 75 and 75a (FIG. 6D). Accordingly, actuation of the switch 24 to the ON position provides power as an auxiliary source, as described above, while disabling the START position of the switch 24. The use of different cable configurations along with a plug that connects in a single orientation ensures that the use of the pack 10 as a primary power source is not available when the switch 24 is in the ON position.

Figure 11A:
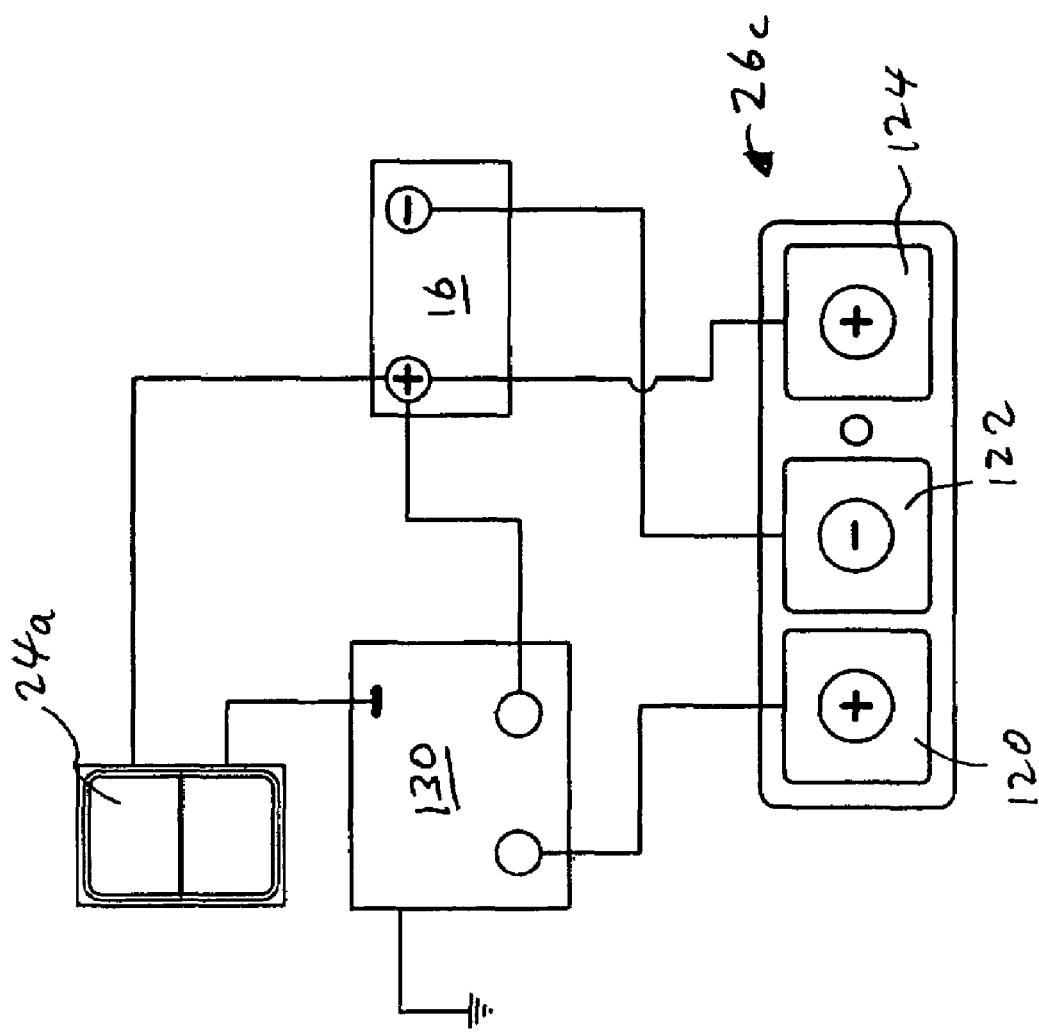
FIG. 11A illustrates another schematic representation of a switch circuit according one embodiment of the invention.

As shown in FIG. 11A, in some embodiments the switch 24 is not a dial or rotary switch but can be implemented as a toggle or single contact momentary switch, such as switch 24a, mounted on the pack 10. FIG. 11A illustrates an exemplary schematic of a switching circuit implemented with the connector 26c. The circuit is configured such that the positive and negative terminals of the battery 16 are respectively connected to terminals 124 and 122 of the connector 26c, thereby providing a "hot" connection for cables configured to provide auxiliary power. The momentary switch 24a is electrically connected between the battery 16 and a starter contactor 130. The contactor 130 is connected between the battery 16 and the terminal 120 of connector 26c and may be implemented with one of several conventional relays. In operation, actuation of the switch 24a couples power to the contactor 130, which closes the relay contacts and completes the connection between the battery 16 and the terminal 120. Because the switch 24a is a momentary switch, a direct current path between the battery 16 and terminal 120 remains only for the duration the operator is actuating the switch 24a and thus the contactor 130. Accordingly, cables configured to provide primary power are enabled only while the operator is actuating the switch 24a.

As described above, one embodiment of the invention provides a portable power source operable to start outdoor power equipment. Various features and aspects of the invention are set forth in the following claims.

The invention claimed is:

1. A portable power source for starting engine-driven equipment having a starter motor, the portable power source comprising:
   an electrochemical power supply;
   a housing substantially enclosing the electrochemical power supply;
   a switch electrically connected to the electrochemical power supply and having an ON position with a fixed contact, and a START position with a momentary contact;
   a connector electrically connected to the switch and operable to be electrically connected to the starter motor;
   wherein the switch is configured to allow a momentary current from the electrochemical power supply to the connector only for the duration the switch is manually held in the START position; and
   wherein the switch is configured to allow a fixed current from the electrochemical power supply to the connector when the switch is manually switched to the ON position.

2. The portable power source of claim 1, wherein the switch is connected to the housing, and includes a dial to manually rotate the switch between the ON position and the START position.

3. The portable power source of claim 1, wherein the switch is connected to the housing, and includes a toggle portion to manually actuate the switch to the START position.

4. The portable power source of claim 1, wherein the fixed contact is adapted to connect the electrochemical power supply as a source of power for a direct current-powered device.

5. The portable power source of claim 1, wherein the momentary contact is adapted to connect the electrochemical power supply as a source of power to start the engine.

6. The portable power source of claim 1, wherein the connector further comprises at least one keyed terminal electrically connected to the switch.

7. The portable power source of claim 1, wherein the connector further comprises a first positive terminal, a second positive terminal, and a ground terminal.

8. The portable power source of claim 1, further comprising a charging input connector operable to receive a current to charge the electrochemical power supply.

9. The portable power source of claim 1, wherein the connector is a first connector, and further comprising a cable having a second connector connected to the first connector and having a third connector configured to be electrically connected to the starter motor.

10. The portable power source of claim 9, wherein the cable includes keyed recesses adapted to mate with one or more keyed terminals of the connector.

11. The portable power source of claim 1, further comprising a power supply condition indicator.

12. The portable power source of claim 1, further comprising an air compressor.

13. The portable power source of claim 1, further comprising an inverter and an output connector to supply alternating current.

14. The portable power source of claim 1, further comprising an integrated light.

15. The portable power source of claim 1, wherein the electrochemical power supply includes a battery.

16. The portable power source of claim 7, wherein the switch is electrically connected to the electrochemical power supply and to the connector, and is configured to allow the fixed current through the first positive terminal and the ground terminal, but not the second positive terminal, when the switch is in the ON position.

17. The portable power source of claim 7, wherein the switch is electrically connected to the electrochemical power supply and the connector, and is configured to allow the momentary current through the second positive terminal and the ground terminal, but not the first positive terminal, when the switch is in the START position.

18. The portable power source of claim 7, wherein the switch is electrically connected to the electrochemical power supply and to the connector, and is configured to
   allow the fixed current through the first positive terminal and the ground terminal, but not the second positive terminal, when the switch is in the ON position, and
   allow the momentary current through the second positive terminal and the ground terminal, but not the first positive terminal, when the switch is in the START position.

19. The portable power source of claim 1 wherein a single connector includes a first positive terminal, a second positive terminal, and a ground terminal.

20. The portable power source of claim 19, wherein the switch is electrically connected to the electrochemical power supply and to the connector, and is configured to allow the fixed current through the first positive terminal and the ground terminal, but not the second positive terminal, when the switch is in the ON position.

21. The portable power source of claim 19, wherein the switch is electrically connected to the electrochemical power supply and the connector, and is configured to allow the momentary current through the second positive terminal and the ground terminal, but not the first positive terminal, when the switch is in the START position.

22. The portable power source of claim 19, wherein the switch is electrically connected to the electrochemical power supply and to the connector, and is configured to
   allow the fixed current through the first positive terminal and the ground terminal, but not the second positive terminal, when the switch is in the ON position, and
   allow the momentary current through the second positive terminal and the ground terminal, but not the first positive terminal, when the switch is in the START position.

23. The portable power source of claim 1, further comprising
   a charging input connector operable to receive a current to charge the electrochemical power supply;
   a power supply condition indicator;
   an air compressor;
   an inverter and an output connector to supply alternating current; and
   an integrated light.

* * * * *